A. S. FLACK.
AIRPLANE BRAKE.
APPLICATION FILED MAR. 18, 1919.
1,329,390.
Patented Feb. 3, 1920.
2 SHEETS—SHEET 1.
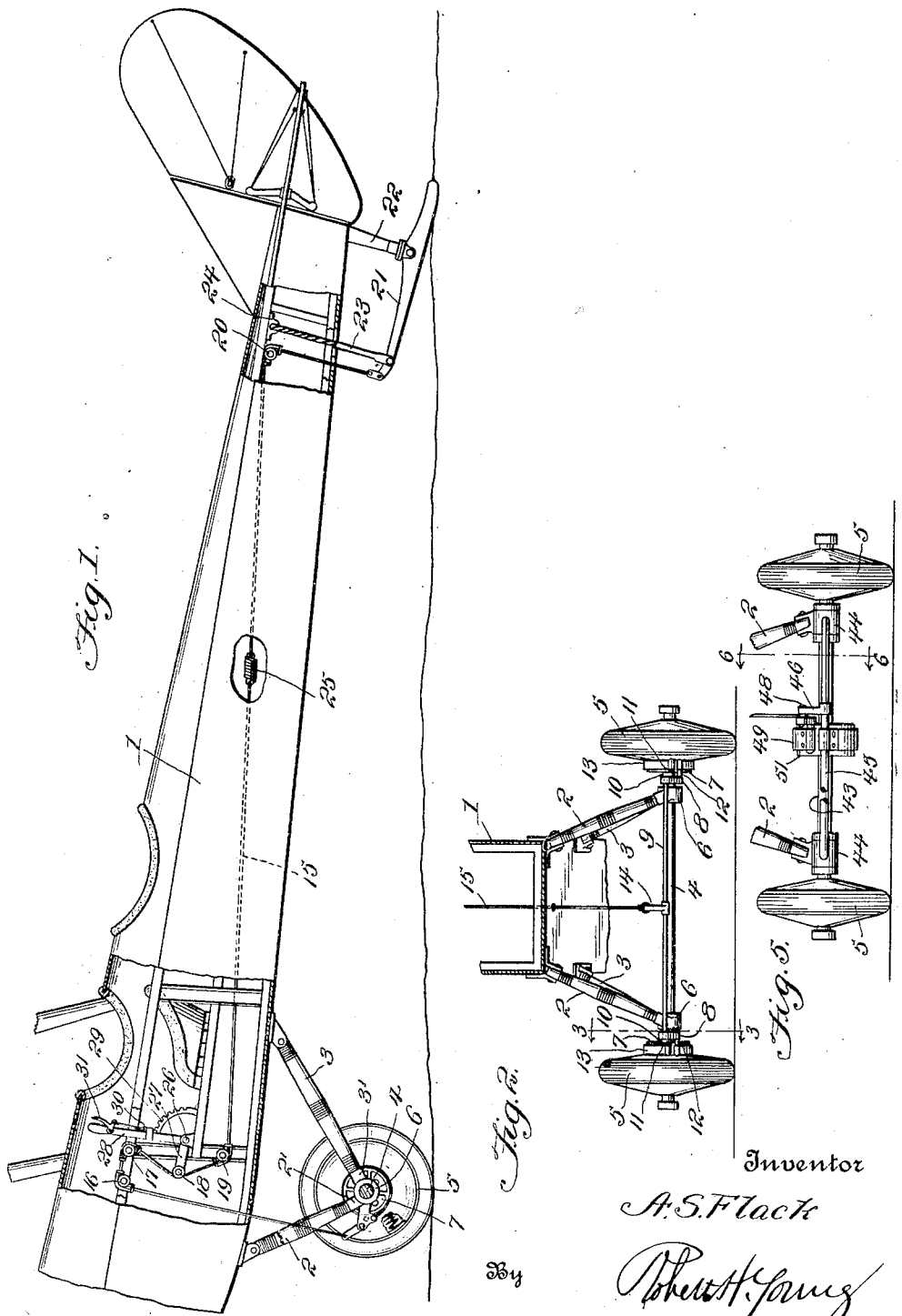

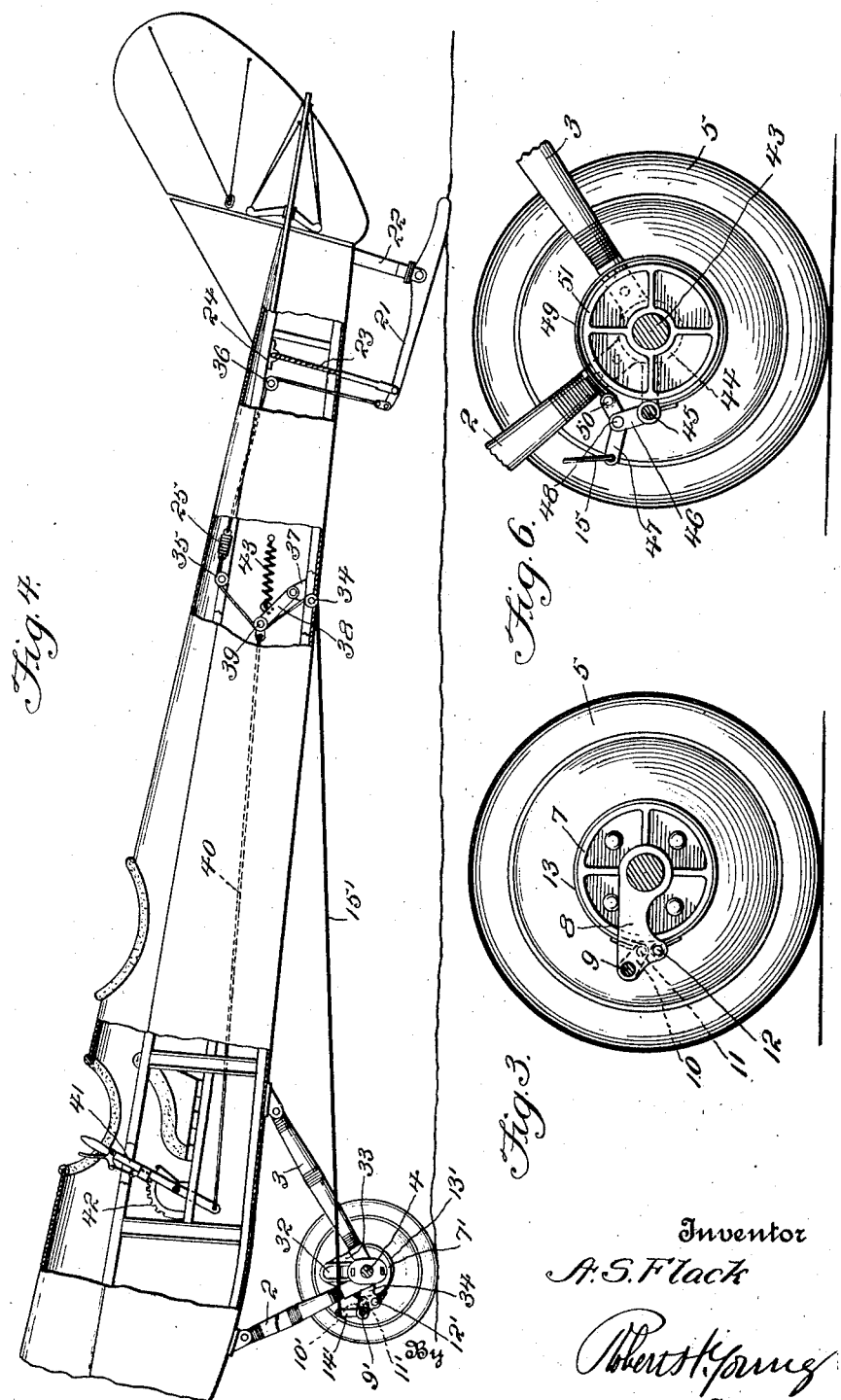

UNITED STATES PATENT OFFICE.

AUGUSTUS S. FLACK, OF LOS ANGELES, CALIFORNIA.

AIRPLANE-BRAKE.

1,329,390.     Specification of Letters Patent.     Patented Feb. 3, 1920.

Application filed March 18, 1919. Serial No. 283,334.

*To all whom it may concern:*

Be it known that I, AUGUSTUS S. FLACK, citizen of the United States, residing at Los Angeles, in the county of Los Angeles and State of California, have invented certain new and useful Improvements in Airplane-Brakes, of which the following is a specification.

This invention relates to a landing gear for airplanes, more particularly with means to apply a brake to the landing gear, so that the airplane will be brought to rest shortly after it lands.

With the ordinary landing gear the airplane runs along the ground for a long distance upon landing, thereby necessitating the use of a large landing field. By the use of a brake on the landing gear this run is minimized so a smaller field will be adequate.

If a brake is applied to the landing gear of the typical airplane, and inasmuch as the center of gravity of the plane is almost directly above the landing gear, there is a tendency, especially if the brake is applied too hard, for the airplane to " nose over " or somersault.

The principal object of this invention is to provide an automatic brake applying means which becomes operative practically as soon as the airplane contacts with the ground, but which immediately releases the brake as soon as the airplane starts to nose over.

It is a further object of this invention to provide a landing gear in which the ground contacting element that is effective in putting on the brake is located at the rear part of the airplane, preferably at the end of the fuselage thereof. so that as soon as this rear end contacts with the ground the brake will be applied, and as soon as it leaves the ground, that is to say, as soon as it starts to nose over, the brake will be released.

It is a further object of this invention to provide means for rendering the above mentioned brake applying means inoperative, as of course when the air plane is leaving the ground, no braking effect is desirable.

Other objects and advantages will appear as the description proceeds.

In the drawings, illustrating certain embodiments of my invention,

Figure 1 is a side view, partly in section of an airplane fuselage with my improved braking device mounted thereon, Fig. 2 is a front view of the same, Fig. 3 is a section on the line 3—3 of Fig. 2, Fig. 4 is a view similar to Fig. 1 of a modification, Fig. 5 is a front view of the same only the lower part of the landing gear being shown, Fig. 6 is a section, enlarged, taken on the line 6—6 of Fig. 5.

Referring now to the drawings, in which similar reference characters indicate similar parts, 1 indicates the airplane fuselage, which carries toward its front end two pairs of landing gear struts 2 and 3. A fixed axle 4 is mounted at the junction of the two pairs of struts. This axle has mounted on the ends thereof wheels 5 of any desired construction, preferably rubber tired and provided with resilient spokes to aid in taking up the shock, inasmuch as a fixed axle is used.

The respective pairs of struts are mounted in sockets 2' and 3' carried by the socket element 6. This socket element 6 also acts as a bearing for the axle 4.

Each wheel 5 is provided with a brake drum 7 rigid and rotatable therewith. A pair of brackets 8 are rigidly mounted on the axle 4, at opposite ends thereof, just outside of the socket carrying element 6. Journaled in these brackets is a transversely extending rod 9. The rod 9 carries, at each end a short arm 10, which arm in turn carries a pin 11. The bracket 8 also carries a pin 12. A brake band 13 encircles the pin 12, passes around the brake drum 7 and is secured to the pin 11. It is apparent therefore that movement of the rod 9 will rotate the arm 10 to tighten the brake band 13 on the brake drum 7.

The brake just described is the conventional band brake, and it should be understood that any other suitable braking means may be used in its stead.

The arm 9 is provided with a rigidly extending arm 14 attached at the center part thereof, to which arm is attached a cable 15. This cable passes around a series of pulleys 16, 17, 18 and 19, mounted on suitable framing elements of the fuselage, and then passes to a pulley 20 on the rear part of the fuselage from whence it passes to the front end of a tail skid 21, where it is fastened. This tail skid may be of a conventional type and is mounted on the lower end of the tail skid post 22. The usual shock absorbing means 23, commonly made out of rubber cable, is fastened to the front end of the skid and to the fuselage at the point 24.

The cable 15 may be provided with a spring 25 inserted in its length to take up sudden shocks.

In landing when the tail skid 21 contacts with the ground it will be apparent that the front end of the skid will pull on the cable 15 to raise the arm 14 and rotate the rod 9 to apply the brake. If the application of the brake causes the machine to start to nose over the tail skid 21 leaves the ground, the cable 23 pulls up the front end of the skid to slacken the cable 15 and so release the brake and so immediately remove the cause of the nosing over.

The means for rendering the brake applying device inoperative when machine is starting will now be described. This means may consist of a bell crank lever pivoted at 26 and comprises the arms 27 and 28. The arm 27 may be provided with the already described pulley 18 and is positioned to engage with the stretch of cable extending between the pulleys 17 and 19. A locking quadrant 29 is positioned adjacent the arm 28, in the notches of which quadrant a latch pin 30 operated by the handle 31, engages. It will be apparent therefore that when the bell crank is in the position shown in Fig. 1 the cable 15 will be tensioned and the brake applying means in operative connection with the tail skid. It will also be apparent that if the arm 28 of the bell crank be moved about 80° to the right, that the arm 18 and pulley 27 will be disengaged from the cable 15 to slacken it up, whereby contact of the tail skid with the ground will not be effective in applying the brake.

In the modification shown in Fig. 4, a landing gear is shown in which the axle is resiliently mounted and which moves upwardly in a guide slot 32 formed in the socket carrying element 33. The other parts of the brake are very similar to those shown in Figs. 1 and 3, the axle having mounted thereon two forwardly extending brackets 34 rigidly therewith, in which brackets the rod 9' is journaled. The rod 9' is provided with a pair of arms 10', each carrying a pin 11' The bracket 9' also carries a pin 12' with which one end of a brake band 13' engages, the other end of the brake band engaging with the pin 11'. The brake band encircles the brake drum 7'. The rod 9' is provided with an operating arm 14' rigid therewith, with which engages the operating cable 15'.

Cable 15' passes around pulleys 34, 35 and 36 fixed to suitable parts of the fuselage and engages with the front end of the tail skid 21.

Pivoted to a bracket 37 is an arm 38 provided with a pulley 39 that engages with the stretch of cable extending between the pulleys 34 and 35. The arm 38 has attached thereto a rod or cable, here shown as a cable 40, which is fastened to the lower end of a locking handle 41 which is provided with conventional means to latch it in various positions along the quadrant 42. A spring 43 is attached to the other side of the arm 38 to act as a retracting spring.

The purpose of the different positioning of the cable 15' in this modification is to provide a structure in which the up and down movement of the axle 4 upon landing will not vary the tension in the cable.

It will be obvious that locking of the handle 41 in various position on its quadrant will slacken or tighten the cable 15' so as to make the tail skid 21 inoperative or operative, respectively.

In the modification shown in Figs. 5 and 6 the axle 43 is of the revolving type and revolves with the wheels 5. Socket carrying elements 44 mount the usual struts 2 and 3 and serve as bearings for the axle 43. A transversely extending rod 45 is mounted to the socket carrying elements 44 to extend between them just in front of the axle 43. Rigidly mounted on the rod 45 is a bracket 46, in the upper end of which is pivoted a bent lever 47 on the pivot 48.

A brake band 49 engages at one end around the rod 45 and at the other end with a pin 50 carried by the bent lever 47. The brake band 49 is mounted to encircle a brake drum 51 which is rigidly mounted on the revolving axle 43. It will now be apparent that when the bent lever 47 is moved upwardly by the cable 15 attached thereto, by the means shown in either Fig. 1 or Fig. 4, that the brake band will be tightened to apply the brake. As in the other modifications the brake will be released as soon as the skid 21 leaves the ground. It will be apparent that rod 45 acts as a brace to aid in bracing the axle bearings apart, as well as a mounting means for the brake band 49. The use of a single brake drum for both wheels results in an equal braking force being applied to both wheels.

While I have illustrated a band brake as applied to the landing gear it should be understood that any conventional braking means may be there used. It should be further understood that while I have shown a conventional tail skid as the ground contacting element mounted at the rear part of the airplane, that my invention is not limited thereto, but any ground contacting element may be there used, such as a wheel for instance.

I claim:

In combination with an airplane, a landing gear comprising an axle, bearings for said axle, wheels fixed to said axle, a brake drum on said axle, a rod serving to brace said bearings apart, a brake band carried by said rod and operatively associated with said brake drum, and means, carried by the rear part of said airplane, operatively connected to said brake band and actuated by contacting with the ground, to apply said brake band to said brake drum.

In testimony whereof I have affixed my signature.

AUGUSTUS S. FLACK.